United States Patent [19]

Bornstein

[11] 4,082,904

[45] Apr. 4, 1978

[54] CONTROL OF PRECURE IN COMPOSITION BOARD MANUFACTURE

[75] Inventor: Leopold F. Bornstein, Tucker, Ga.

[73] Assignee: Georgia-Pacific Corporation, Portland, Oreg.

[21] Appl. No.: 680,598

[22] Filed: Apr. 26, 1976

[51] Int. Cl.² .................. B32B 21/02; B32B 27/42; C08L 61/20
[52] U.S. Cl. ............................ 428/528; 260/69 R; 260/71; 260/17.3; 260/29.4 R; 428/526; 428/538; 428/532; 428/537; 428/326; 156/331; 156/62.2
[58] Field of Search ........ 428/532, 534, 535, 537–539, 428/407, 372, 393, 326; 260/17.3, 29.4 UA, 29.4 R, 69 R; 156/331, 299

[56] References Cited

U.S. PATENT DOCUMENTS

| 1,904,244 | 4/1933 | Landecker | 260/71 X |
| 2,227,709 | 1/1941 | Cordier | 260/71 X |
| 2,679,490 | 5/1954 | Meiser et al. | 260/17.3 |
| 3,535,199 | 10/1970 | Kuhr et al. | 260/69 R |
| 3,563,844 | 2/1971 | Brown et al. | 428/535 X |
| 3,816,236 | 6/1974 | Baymiller | 156/331 X |
| 3,905,847 | 9/1975 | Black | 428/407 X |
| 3,940,538 | 2/1976 | Palazzolo | 428/535 X |
| 3,975,572 | 8/1976 | Power | 428/537 X |

*Primary Examiner*—George F. Lesmes
*Assistant Examiner*—Alexander S. Thomas
*Attorney, Agent, or Firm*—Schuyler, Birch, Swindler, Mckie & Beckett

[57] ABSTRACT

Surface precure of amine-aldehyde resins employed in the manufacture of composition board can be prevented by adding a water soluble thiosulfate salt, e.g., sodium thiosulfate, to the resin.

20 Claims, No Drawings

CONTROL OF PRECURE IN COMPOSITION BOARD MANUFACTURE

BACKGROUND OF THE INVENTION

1. Field of the Invention

This invention relates to the prevention of surface precure of thermosetting amine-aldehyde resins in the manufacture of composition board.

2. Description of the Prior Art

"Surface precure," as used herein refers to premature instantaneous curing of the thermosetting resin at the composition board surface, which results in the formation of a thin surface layer of "case hardened" material. Precure is caused by heat transfer from the high temperature presses normally employed during consolidation of the board. The case hardened surface layer prevents uniform consolidation and curing of the board by interfering with proper heat transfer into the center of the board. In addition to structural inferiority occasioned by nonuniform curing, the prior art board surface possesses a poor appearance and feel which can only be removed by deep sanding. Thickness and material loss upon sanding, however, decrease the strength characteristics of the board even further.

Prior art attempts to control surface precure in composition board applications have centered around the use of urea as a cure retarding agent. See, e.g., Menger, U.S. Pat. No. 2,236,184 and Peters, U.S. Pat. No. 3,649,307. Urea commonly is added to urea-formaldehyde resins either during the resin forming step or to the finished resin as a post-additive. Urea addition, however, has not provided suitable precure prevention. Urea exhibits negligible precure resisting effects at the high temperature conditions which generally give rise to precure in composition board processes. Moreover, the increased urea ratio in such an extended resin results in excessive penetration and flow which adversely affect the board strength.

SUMMARY OF THE INVENTION

It is, therefore, an object of this invention to provide a resin composition which can be employed in conventional composition board processes, but which does not suffer from the disadvantages of the prior art with respect to surface precure.

It is also an object of this invention to provide an improved composition board with greater strength and better surface properties.

It is a further object of this invention to provide a method for producing composition board which does not suffer from the surface precure problems of the prior art.

It is also an object of this invention to provide a method for preventing surface precure in the manufacture of composition board which will have no adverse effects on the cured composition board.

In accordance with this invention, there is provided a method for preventing surface precure of a composition board formed by consolidating under heat and pressure a mass of comminuted cellulosic material coated with a thermosetting amine-aldehyde resin binder, the method comprising adding a water soluble thiosulfate salt to the resin binder in an amount effective to prevent surface precure of the board during the consolidation.

The present invention is also directed to a cured composition board having improved surface and strength characteristics, the board comprising comminuted cellulosic materials bonded into a unitary mass by a thermoset amine-aldehyde resin, the resin having added thereto, at least in the regions adjacent to the surface of the board, a water soluble thiosulfate salt in the amount sufficient to prevent surface precure of the resin.

In accordance with another embodiment of this invention, there is provided a method for producing a composition board having improved surface and strength characteristics comprising the steps of coating a mass of comminuted cellulosic materials with a thermosetting amine-aldehyde resin, and consolidating the mass of resin-coated comminuted cellulosic materials under heat and pressure; said amine-aldehyde resin having added thereto, at least in the regions adjacent to the surface of said mass, a water soluble thiosulfate salt in an amount sufficient to prevent surface precure of the resin during the consolidation step.

In addition, this invention is directed to a resin composition for use as a binder in the manufacture of composition board, the resin composition comprising a thermosetting amine-aldehyde resin and a minor amount of a water soluble thiosulfate salt.

DETAILED DESCRIPTION OF THE INVENTION

Applicant has surprisingly found that surface precure can be prevented by incorporating a small amount of a water soluble thiosulfate salt (e.g., $Na_2S_2O_3$) into the amine-aldehyde thermosetting resins commonly employed in the manufacture of composition board. The term "composition board," as employed in the specification and claims, includes various composite boards generally known as particleboard, chipboard, flakeboard, fiberboard, and the like. While not wishing to be bound by a particular theory, applicant believes that the thiosulfate salt prevents resin precure by tying up free formaldehyde into sulfur modified groups of trithiane type having the following approximate structure:

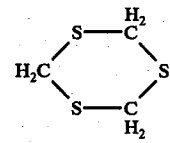

The thiosulfate salt-modified resin of the present invention prevents precure and surface case hardening, thus promoting an even and efficient transfer and distribution of heat to the center of the composition board. The resulting board is better consolidated and therefore stronger, and exhibits an enhanced surface appearance and feel.

Contrary to the applicant's findings, the prior art suggests that thiosulfate salts may accelerate rather than retard the curing of thermosetting resins. For example, Takahashi (Chem. Abstracts No. 7775f) discloses a mixture of sodium thiosulfate and a neutral salt such as sodium sulfate for use as a latent catalyst for amine resins. Similarly, Cordier, U.S. Pat. No. 2,227,709, discloses a urea-formaldehyde resin system containing a latent accelerator of the formula $XYS_2O_3$ where X can be sodium and the Y is one of a number of specified organic radicals. Both the Takahashi and Cordier additives break down when subjected to the high pressures and temperatures of curing to give agents effective to speed up rather than slow down cure of the resin. Thus, the prior art has taught directly away from applicant's discovery that thiosulfate salts will prevent precure of amine-aldehyde resins in composition board applications.

The resin composition of the present invention comprises a major portion of an amine-aldehyde thermosetting resin. While any amine-aldehyde resin may be employed, urea-formaldehyde resins are preferred. Additional examples of amine-aldehyde resin suitable for use in the present invention include the reaction product of formaldehyde with melamine, benzoguanamine, ammeline, and the like. Also useful are amine-aldehyde resins containing more than one amine component, such as urea-melamine-formaldehyde resins. In general the amine: aldehyde ratio of suitable resins falls within the range of about 1:1.3 to 1:2. The amine-aldehyde resin may be employed as a solution or dispersion, and may contain extenders or fillers such as wheat and rye flour, rice hulls, pecan and walnut shell flour, wood flour, and the like.

The resin composition of the present invention additionally contains a minor amount of a water soluble thiosulfate salt. The preferred thiosulfate salt is sodium thiosulfate. Other water soluble thiosulfate salts such as those of ammonium and potassium are also suitable for the practice of the present invention. The thiosulfate salt should be added in an amount sufficient to prevent surface precure of composition board during the consolidation step. In typical operations, thiosulfate salt additions of at least about 1% by weight of the resin are suitable to achieve this result. Satisfactory results are achieved when the thiosulfate salt is added in amounts of about 1% to about 5% by weight of the resin.

Landecker, U.S. Pat. No. 1,904,244, discloses a urea formaldehyde molding resin which is modified to prevent cracking by adding a major portion of a sulfur-containing compound. One of the sulfur-containing compounds mentioned in Landecker is sodium thiosulfate. Landecker provides no teaching whatsoever that minor amounts of sodium thiosulfate, or thiosulfate salts in general, will prevent surface precure of amine-aldehyde resins in the production of composition board.

The present invention also contemplates an improved method for manufacturing composition board. In general, the composition board process of the present invention comprises coating a mass of cellulosic materials with a thermosetting amine-aldehyde resin and consolidating the mass under heat and pressure. Suitable cellulosic materials generally include various wood products such as wood particles, chips, flakes, fibers and the like. In typical composition board applications, the resin will comprise from about 0.5 to 15% based on the weight of the cellulosic materials, although amounts of resin up to about 40 to 50% or more may be employed for certain applications. The resin-coated mass of comminuted cellulosic materials is generally free-flowing and may be used in any conventional composition board manufacturing apparatus. The consolidation step is carried out at a temperature and pressure suitable to achieve a dense fully cured board-like structure. Depending on the materials employed, pressures of from about 50 to 600 psi and temperatures of from about 200° to 500° F are suitable to achieve this result.

The method of the present invention contemplates the addition of a minor amount of a water soluble thiosulfate salt to the resin, at least in the region adjacent to the surface of the mass. This thiosulfate salt can be added to the finished resin at any time up to the coating step, or can even be applied externally to the surfaces of the resin-coated cellulosic mass.

In one embodiment of the process of this invention, the entire furnish of comminuted cellulosic materials is coated with the thiosulfate salt-containing resin composition described above and this mass is consolidated. Upon consolidation, the thiosulfate salt in the areas adjacent to the board surface is effective to prevent surface precure. In another embodiment, the thiosulfate salt is only added to the resin which is adjacent to the board surface. This may be accomplished by first forming a board core preform from a mass of comminuted cellulosic materials coated with a thermosetting resin. Since no thiosulfate salt is added to this core section, any thermosetting resin may be employed. A face layer of cellulosic materials coated with a second resin then is positioned over the surfaces of the core preform. This second resin comprises the thiosulfate salt-containing amine-aldehyde resin of the present invention. The resulting composite preform can then be consolidated as described above.

In general the above described composition board process is employed without the use of any curing catalysts. At least in the areas adjacent to the board surface, such a curing agent would, of course, work against the precure preventing agent of the present invention. In some cases, however, it may be desirable to accelerate the resin cure in the center or core of the board. This may be accomplished by adding to the core resin a convention curing catalyst, such as ammonium sulfate or ammonium chloride.

The board-like product produced by the above process exhibits greater strength due to the more uniform consolidation and curing achieved in the absence of surface precure. Additionally, the board surface possesses a more desirable appearance and feel without the necessity of deep sanding.

The following example is included for illustrative purposes only and is not intended to limit the scope of the invention.

EXAMPLE

⅜ inch flakeboard samples were prepared by consolidating a mixture of wood flakes and a urea-formaldehyde resin binder in an amount of 7% based on resin solids on bone-dry furnish. The binder adjacent to the board faces was modified by adding 4% of a 66% sodium thiosulfate solution. The press platen temperature was 340° F and the press cycle was 3.75 minutes. Closing time for the press was about 1.0 to 1.25 minutes. For comparison purposes, a group of control boards were made as described above except that no thiosulfate salt was added to the face resin. The following chart summarizes the results of tests run on both sets of boards:

| Board | Thickness | Density | IB | 1,000 Taber Abraser Cycles | |
|---|---|---|---|---|---|
| | | | | Depth of Cut | Weight Loss |
| Control | .590" | 44.6 pcf | 107 | 0.27" | 1.34 gm |
| $Na_2S_2O_3$ Added | .622" | 45.9 pcf | 153 | 0.12" | 0.55 gm |

The IB test measures the "internal bond" strength exhibited when a board is pulled apart. The absence of surface precure in the $Na_2S_2O_3$ treated board permits more heat transfer to the center of the board giving a better cure and, therefore, higher IB values.

The Taber Abraser test measures the surface consolidation of the board. Where precure occurs the thin case hardened layer prevents uniform consolidation of the sub-surface layer. Upon abrasion this hard easily layer chips off. Moreover, the precured resin at the board surface has very poor flow and therefore almost no bonding ability. As a result, the loose unbonded fibers or particles under the surface layer can be easily abraded. Where no surface precure occurs, as the $Na_2S_2O_3$ treated board shows, the uniformly dense and well cured surface layer is not as easily abraded. Thus the board of the present invention has lower cut depth and weight loss values.

While certain specific embodiments of the invention have been described with particularity herein, it should be recognized that various modifications thereof will occur to those skilled in the art. Therefore, the scope of the invention is to be limited solely by the scope of the claims appended hereto.

I claim:

1. A method for preventing surface precure of a composition board formed by consolidating under heat and pressure a mass of comminuted cellulosic material coated with a thermosetting amine-aldehyde resin binder, said method comprising adding a water soluble thiosulfate salt selected from the group consisting of sodium thiosulfate, potassium thiosulfate, and ammonium thiosulfate to said resin binder in an amount from about 1 to about 5% by weight of the resin to prevent surface precure of said resin during said consolidation.

2. The method of claim 1 wherein said amine-aldehyde resin is urea-formaldehyde.

3. The method of claim 1 wherein said thiosulfate salt is sodium thiosulfate.

4. The method of claim 1 wherein said comminuted cellulosic material is wood particles, wood chips, wood flakes, or wood fibers.

5. A cured composition board having improved surface and strength characteristics, said board comprising comminuted cellulosic materials bonded into a unitary mass by a thermoset amine-aldehyde resin, said resin having added thereto, at least in the regions adjacent to the surface of said board, a water soluble thiosulfate salt selected from the group consisting of sodium thiosulfate, potassium thiosulfate, and ammonium thiosulfate in an amount from about 1 to about 5% by weight of the resin to prevent surface precure of said resin.

6. The cured composition board of claim 5 wherein said amine-aldehyde resin is urea-formaldehyde.

7. The cured composition board of claim 5 wherein said thiosulfate salt is sodium thiosulfate.

8. The cured composition board of claim 5 wherein said comminuted cellulosic material is wood particles, wood chips, wood flakes, or wood fibers.

9. A method for producing a composition board having improved surface and strength characteristics comprising the steps of:
   (a) coating a mass of comminuted cellulosic materials with a thermosetting amine-aldehyde resin; and
   (b) consolidating said mass of resin-coated comminuted cellulosic materials under heat and pressure to form a cured, unified board-like structure;
   said amine-aldehyde resin having added thereto at least in the regions adjacent to the surface of said mass, a water soluble thiosulfate salt selected from the group consisting of sodium thiosulfate, potassium thiosulfate, and ammonium thiosulfate in an amount from about 1 to about 5% by weight of the resin to prevent surface precure and said resin during said consolidation step.

10. The method of claim 9 wherein said amine-aldehyde resin is urea-formaldehyde.

11. The method of claim 9 wherein said thiosulfate salt is sodium thiosulfate.

12. A method of claim 9 wherein said comminuted cellulosic material is wood particles, wood chips, wood flakes, or wood fibers.

13. A method for producing a composition board having improved surface and strength characteristics comprising the steps of:
   (a) coating a mass of comminuted cellulosic materials with a thermosetting amine-aldehyde resin, said resin containing from about 1 to about 5% by weight of the resin of a water soluble thiosulfate salt selected from the group consisting of sodium thiosulfate, potassium thiosulfate, and ammonium thiosulfate; and
   (b) consolidating said mass of resin-coated cellulosic materials under heat and pressure to form a cured, unified board-like structure;
   said thiosulfate salt preventing surface precure of said resin during said consolidation step.

14. The method of claim 9 wherein said amine-aldehyde resin is urea-formaldehyde.

15. The method of claim 14 wherein said thiosulfate salt is sodium thiosulfate.

16. The method of claim 13 wherein said comminuted cellulosic material is wood particles, wood chips, wood flakes, or wood fibers.

17. A method for producing a composition board having improved surface and strength characteristics comprising the steps of:
   (a) coating a first mass of comminuted cellulosic materials with a thermosetting resin;
   (b) forming said first mass of resin-coated materials into a board core preform;
   (c) coating a second mass of comminuted cellulosic materials with a thermosetting amine-aldehyde resin, said amine-aldehyde resin containing from about 1 to about 5% by weight of the resin of a water soluble thiosulfate salt selected from the group consisting of sodium thiosulfate, potassium thiosulfate, and ammonium thiosulfate;
   (d) positioning a face layer of said second mass of resin-coated cellulosic materials on the surfaces of said board core preform to form a composite board preform; and
   (e) consolidating said composite board preform under heat and pressure to form a cured, unified board-like structure;
   said thiosulfate salt in said amine-aldehyde resin preventing surface precure of said amine-aldehyde resin during said consolidation step.

18. The method of claim 17 wherein said amine-aldehyde resin is urea-formaldehyde.

19. The method of claim 17 wherein said thiosulfate salt is sodium thiosulfate.

20. The method of claim 17 wherein said comminuted cellulosic material is wood particles, wood chips, wood flakes, or wood fibers.

* * * * *